(12) United States Patent
Gouko et al.

(10) Patent No.: US 11,131,369 B2
(45) Date of Patent: Sep. 28, 2021

(54) FAILURE DIAGNOSTIC APPARATUS FOR BALL SCREW DEVICE

(71) Applicant: DENSO CORPORATION, Kariya (JP)

(72) Inventors: Norio Gouko, Kariya (JP); Toshihisa Taniguchi, Kariya (JP); Atusi Sakaida, Kariya (JP); Keiji Okamoto, Kariya (JP); Yoshihiko Shiraishi, Kariya (JP); Masahiro Asano, Kariya (JP); Tomikazu Ishikawa, Kariya (JP); Atsushi Kusaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 383 days.

(21) Appl. No.: 16/361,267

(22) Filed: Mar. 22, 2019

(65) Prior Publication Data

US 2019/0293157 A1 Sep. 26, 2019

(30) Foreign Application Priority Data

Mar. 26, 2018 (JP) .............................. JP2018-057855

(51) Int. Cl.
*F16H 25/24* (2006.01)
*F16H 25/20* (2006.01)
*F16H 25/22* (2006.01)

(52) U.S. Cl.
CPC ..... *F16H 25/2015* (2013.01); *F16H 25/2204* (2013.01)

(58) Field of Classification Search
CPC ............. F16H 25/2015; F16H 25/2204; F16H 2057/018
See application file for complete search history.

(56) References Cited

U.S. PATENT DOCUMENTS

2013/0255419 A1* 10/2013 Iida ..................... F16H 25/2418
74/424.81

FOREIGN PATENT DOCUMENTS

JP 2005-303179 A 10/2005
WO WO-2006/001480 A1 1/2006

* cited by examiner

*Primary Examiner* — Randell J Krug
(74) *Attorney, Agent, or Firm* — Harness, Dickey & Pierce, P.L.C.

(57) ABSTRACT

A failure diagnostic apparatus for use in a ball screw conveyer includes a bearing stopper placed in contact with a bearing supporting a ball screw, a sensor unit equipped with an elastic member and a heat flux sensor, and a malfunction detector. The heat flux sensor works to produce an output as a function of deformation or displacement of the bearing stopper. The malfunction detector works to analyze the output from the heat flux sensor to detect a failure in operation of the ball screw conveyer. This enables a malfunction of the ball screw conveyer to be detected quickly and accurately.

4 Claims, 11 Drawing Sheets

FAILURE DIAGNOSTIC APPARATUS FOR BALL SCREW DEVICE

CROSS REFERENCE TO RELATED DOCUMENT

The present application claims the benefit of priority of Japanese Patent Application No. 2018-57855 filed on Mar. 26, 2018, the disclosure of which is incorporated herein by reference.

BACKGROUND

1. Technical Field

This disclosure relates generally to a failure diagnostic apparatus for a ball screw device.

2. Background Art

Conveyers are known which use linear motion into which rotational motion of a ball screw is translated to carry an object. For example, Japanese Patent First Publication No. 2005-303179 teaches a failure detector for a ball screw which is equipped with a torque sensor and a failure diagnostic device. The torque sensor measures a load torque on an electrical motor working to rotate the ball screw. The failure diagnostic device works to determine whether a failure in operation of the ball screw has occurred or not.

The above failure diagnostic device, however, suffers from a drawback in that a change in torque occurring when the failure is occurring is less than that when the ball screw is operating properly, thus resulting in a difficulty in detecting a failure in operation of the ball screw arising from mechanical wear of a sliding parts of the ball screw which will result in a small change in torque on the motor.

Usually, there is a time lag between occurrence of a failure in operation of the ball screw and detection of a change in torque of the motor, which leads to concern about a lag in detection of the failure.

Sensors, such as stain gauges, which need to be supplied with electric power from an external source may be used to detect a failure in operation of a ball screw or a bearing retaining the ball screw. Such sensors, however, counter a risk that an error in the detection may occur due to electrical noise created by supply of electric power from an external power source. Sensors required to be supplied with electric power, therefore, still have concern about a decrease in accuracy in failure detection.

SUMMARY

It is an object of this disclosure to provide a failure diagnostic apparatus capable of detecting a failure in operation of a ball screw quickly and accurately.

According to one aspect of this disclosure, there is provided a failure diagnostic apparatus which works to detect a failure in operation of a ball screw conveyer which uses linear motion into which rotational motion of a ball screw is translated to convey an object. The failure diagnostic apparatus comprises: (a) a contact member; (b) an expandable/contractable member; (c) a heat flux sensor, and (d) a malfunction detector.

The contact member is arranged in contact with one of the ball screw and a bearing which retains an end of the ball screw.

The expandable/contractable member expands in response to displacement of the contact member to absorb heat or contracts in response to the displacement of the contact member to produce heat.

The heat flux sensor to which heat of the expandable/contractable member is transmitted includes an insulating substrate, first layer-to-layer connecting members, second layer-to-layer connecting members, and conductive patterns. The insulating substrate is made of thermoplastic resin and has formed therein first via holes and second via holes which pass through a thickness of the insulating substrate and are arranged alternately. The first layer-to-layer connecting members are disposed in the first via holes. The second layer-to-layer connecting members are made from metallic material different from that of the first layer-to-layer connecting member and disposed in the second via holes. The conductive patterns alternately connect the first layer-to-layer connecting member and the second layer-to-layer connecting member together.

The malfunction detector is electrically connected to the heat flux sensor and works to detect a failure in operation of the ball screw conveyer using an output from the heat flux sensor.

The first layer-to-layer connecting members and/or the second layer-to-layer connecting members may be made from alloy solid-state sintered to maintain original crystal structures of metallic atoms of the alloy. The heat flux sensor works to produce an output as a function of quantity of heat passing through the expandable/contractable member.

The malfunction detector is electrically connected to the heat flux sensor and detects a malfunction of the ball screw conveyer using the output from the heat flux sensor.

In the failure diagnostic apparatus, a heat flux which is created by thermal energy produced or absorbed by the expandable/contractable member as a function of a degree of displacement of the contact member arranged in contact with the bearing or the ball screw flows in the expandable/contractable member. The heat flux passes through the heat flux sensor. The heat flux sensor produces an output as a function of the quantity of the heat flux and provides the output to the malfunction detector.

The failure diagnostic apparatus, as apparent from the above discussion, serves to measure the quantity of heat flux flowing in the expandable/contractable member which arises from displacement of the bearing or the screw ball. The malfunction detector detects a failure in operation of the ball screw conveyer using the output from the heat flux sensor which is a function of the quantity of the heat flux. This achieves the detection of malfunction of the ball screw conveyer quickly and accurately.

The expandable/contractable member in the failure diagnostic apparatus is capable of producing or absorbing heat in response to a small degree of displacement of the bearing or the ball screw, thereby ensuring the stability in sensing the displacement of the bearing or the ball screw with high accuracy.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
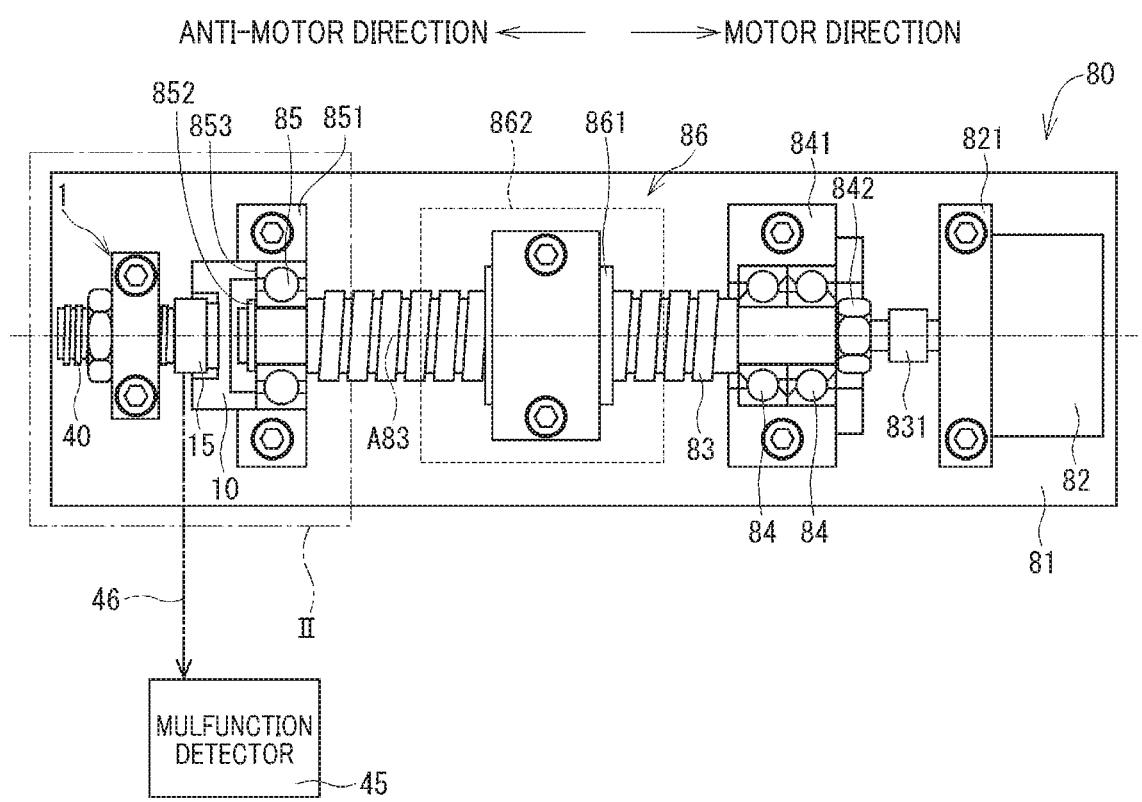
FIG. 1 is a schematic view which illustrates a ball screw conveyer in which a failure diagnostic apparatus according to the first embodiment is used.

Embodiments will be described below. Throughout the drawings, the same reference numbers will refer to the same parts, and repeated explanation thereof will be omitted.

First Embodiment

FIGS. 1 to 11 illustrate the failure diagnostic apparatus 1 according to the first embodiment. The failure diagnostic apparatus 1, as referred to herein, is used in the ball screw conveyer 80. The ball screw conveyer 80 is engineered to use linear motion into which rotational motion of the ball screw 83 is translated to carry the movable object 86 which will also be referred to as a carried target. For example, the ball screw conveyer 80 is, as demonstrated in FIG. 8, used to clamp and carry the press-fitting member 91 to achieve press-fit in the press-fitted member 92.

Figure 2:
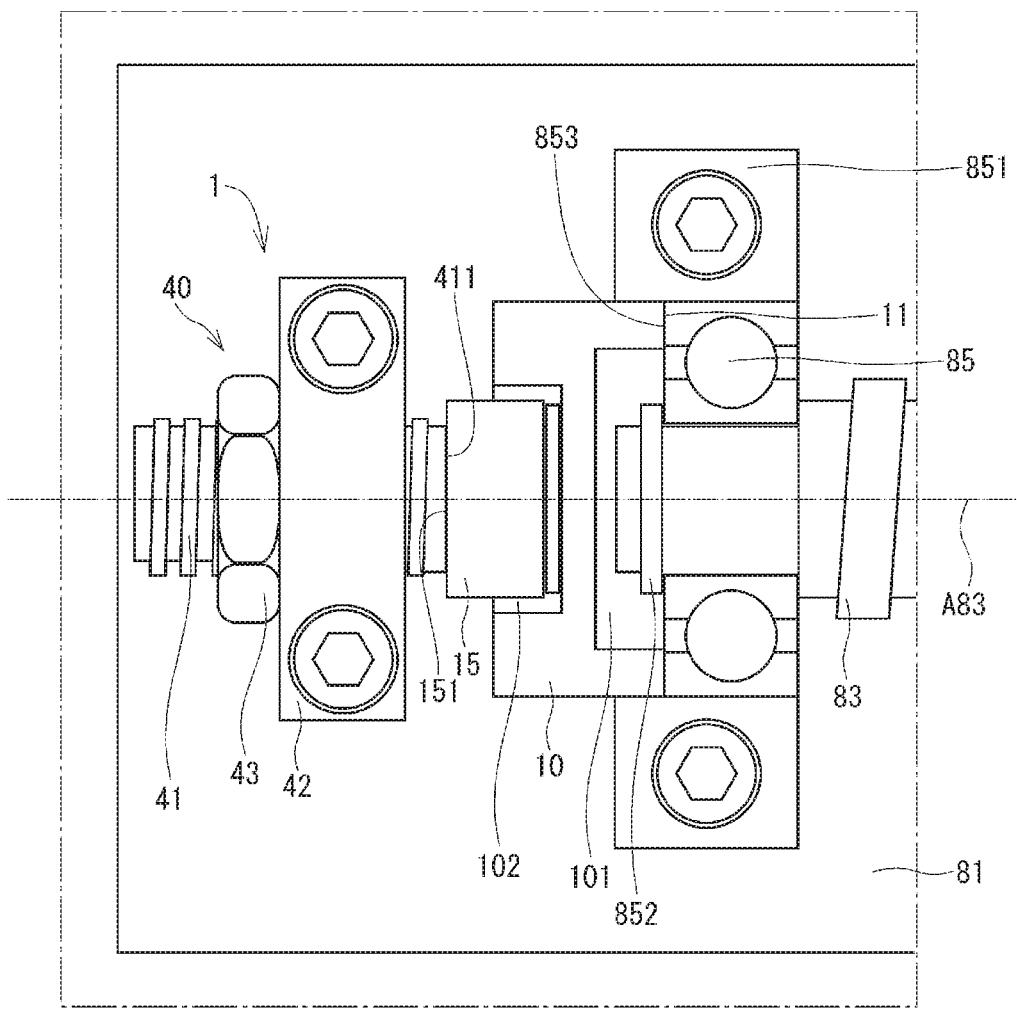
FIG. 2 is an enlarged view enclosed by a line II in FIG. 1.

The structure of the ball screw conveyer 80 will first be described with reference to FIG. 1. The ball screw conveyer 80 includes the base plate 81, the electrical motor 82, the ball screw 83, the motor-side bearings 84, the anti-motor-side bearing 85, and the movable object 86 (i.e., the carried target). In FIGS. 1 and 2, a direction to the electrical motor 82 will be referred to as a motor direction, while a direction opposite the motor-direction will be referred to as an anti-motor direction.

The base plate 81 is secured to a table, not shown. The electrical motor 82 and the failure diagnostic apparatus 1 are mounted on the base plate 81.

The electrical motor 82 is disposed on an end of the base plate 81. The electrical motor 82 is attached to the base plate 81 using the motor securing plate 821. The electrical motor 82 is supplied with electric power from an external source, not shown, to produce torque for rotating the ball screw 83.

The ball screw 83 is made of a shaft with a thread formed in an outer periphery thereof. The ball screw 83 has an end which is close to the motor 82 and joined to a rotating shaft of the electrical motor 82 through the coupling 831. The ball screw 83 extends from the electrical motor 82 in the anti-motor direction on the base plate 81.

The motor-side bearings 84 serve to rotatably retain an end of the ball screw 83 which faces the motor 82. The motor-side bearings 84 are implemented by angular contact bearings and permit the axis of the ball screw 83 to experience a certain amount of shake. The motor-side bearings 84 are disposed in the motor-side bearing holder 841 secured to the base plate 81. The motor-side bearing holder 841 retains radial outer peripheries of the motor-side bearings 84. The ball screw 83 is held by the bearing nut 842 from being shifted along the center axis A83 of the ball screw 83. The bearing nut 842 is arranged on an end of the motor-side bearings 84 facing the motor 82.

The anti-motor-side bearing 85 serves to rotatably retain an end of the ball screw 83 facing away from the motor 82. The anti-motor-side bearing 85 permits a certain amount of shift of the ball screw 83 along the center axis A83. The anti-motor-side bearing 85 is disposed in the anti-motor-side bearing holder 851 secured to the base plate 81. The anti-motor-side bearing holder 851 retains a radial outer periphery of the anti-motor-side bearing 85. The ball screw 83 is held by the circlip 852 from being dislodged outside the anti-motor-side gearing 85. The circlip 852 is disposed on an end of the anti-motor-side bearing 85 which faces away from the motor 82.

The movable object 86 is movable on the length or the center axis A83 of the ball screw 83 between the motor-side bearings 84 and the anti-motor-side bearing 85. The movable object 86 is equipped with the ball nut 861 through which the ball screw 83 passes and the table 862 which is movable along with the ball nut 861. The ball nut 861 has formed on an inner periphery thereof a thread ridge engaging the thread groove of the ball screw 83. In operation, when the ball screw 83 rotates in a first direction, the movable object 86 will be moved in the motor direction. Alternatively, when the ball screw 83 rotates in a second direction opposite the first direction, the movable object 86 will be moved in the anti-motor direction.

The structure of the failure diagnostic apparatus 1 will be described below with reference to FIGS. 1 to 5. The failure diagnostic apparatus 1 is arranged farther away from the motor 82 than the anti-motor-side bearing 85 is on the ball screw conveyer 80. The failure diagnostic apparatus 1 includes the bearing stopper 10 (which will also be referred to as a contact member), the sensor unit 15, the adjustment screw unit 40, and a malfunction detector 45.

The bearing stopper 10 is of a columnar shape and has the motor-facing end surface 11 which faces the motor 82. The motor-facing end surface 11 is placed in contact with the end surface 853 of the anti-motor-side bearing 85 which faces away from the motor 82. The bearing stopper 10 has formed therein the chamber 101 and the chamber 102 located farther away from the motor 82 than the chamber 101 is. The chamber 101 has disposed therein the circlip 852 and the end of the ball screw 83 which faces away from the motor 82. The chamber 102 has a portion of the sensor unit 15 disposed therein.

Figure 3:
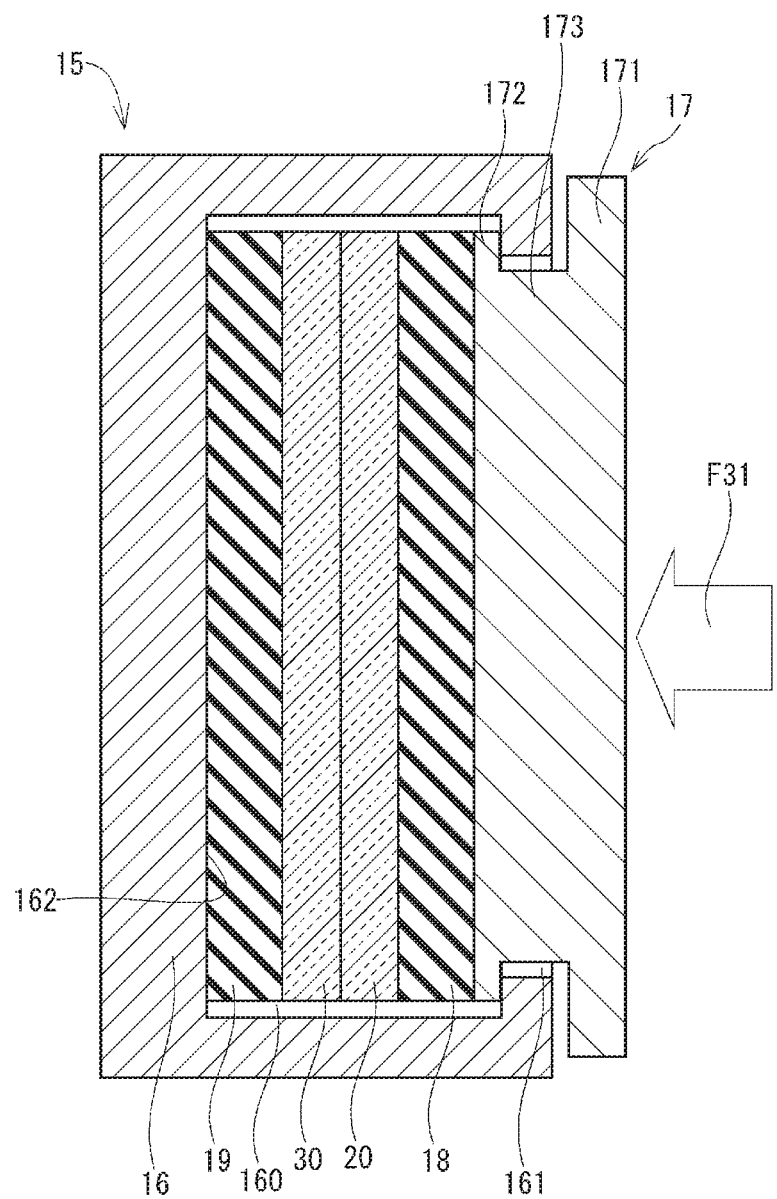
FIG. 3 is a sectional view which illustrates a sensor unit installed in the failure diagnostic apparatus shown in FIGS. 1 and 2.

The sensor unit 15 is disposed between the bearing stopper 10 and the adjustment screw unit 40. The sensor unit 15, as illustrated in FIG. 3, includes the housing 16, the cover plate 17, the elastic members 18 and 19 working as expandable/contractable members, and the heat flux sensors 20 and 30.

The housing 16 is of a cup-shape and made of metal such as martensitic stainless steel. The housing 16 is located closer to the adjustment screw unit 40 than other parts of the sensor unit 15 are. The housing 16 has formed therein the housing chamber 160 with the opening 161 facing the motor 82. The housing chamber 160 has the elastic members 18 and 19 and the heat flux sensors 20 and 30 disposed therein.

The cover plate 17 is made of a substantially circular plate and partially arranged inside the opening 161 of the housing 16. The cover plate 17 is equipped with the flanges 171 and 172 and the joint portion 173. The flange 171 is arranged outside the housing 16 and placed in direct contact with the bearing stopper 10 in the chamber 102. The flange 171 has an outer diameter greater than an inner diameter of the opening 161. The flange 172 is arranged inside the housing chamber 160 of the housing 16 and secured firmly to the elastic member 18 using, for example, adhesive. The flange 172 has an outer diameter greater than an inner diameter of the opening 161. The joint portion 173 connects between the flange 171 and the flange 172. The joint portion 173 has an outer diameter smaller than the inner diameter of the opening 161.

Each of the elastic members 18 and 19 is made from, for example, Viton rubber. The elastic members 18 and 19 are located inside the housing chamber 160. The elastic member 18 is located closer to the motor 82 than the heat flux sensors 20 and 30 are. The elastic member 18 is fixed on the flange 172. The elastic member 19 is attached using, for example, adhesive to the inner wall 162 of the housing 16 defining the housing chamber 160. The elastic members 18 and 19 contract in response to deformation or movement of the cover plate 17 close to the housing 16, so that they produce heat. Alternatively, the elastic members 18 and 19 expand in response to deformation or movement of the cover plate 17 away from the housing 16, so that they absorb heat.

The heat flux sensors 20 and 30 are interposed between the elastic member 18 and the elastic member 19. The heat flux sensor 20 is attached to the elastic member 18 using, for example, adhesive. Similarly, the heat flux sensor 30 is attached to the elastic member 19 using, for example, adhesive. The heat flux sensors 20 and 30 are flexible and deformed in response to contraction or expansion of the elastic member 18 and the elastic member 19, respectively. The heat flux sensors 20 and 30 are of a circular shape. A flow of thermal energy or heat flux produced between the elastic member 18 and the elastic member 19 passes through the heat flux sensors 20 and 30. Specifically, each of the heat flux sensors 20 and 30 is sensitive to a heat flux crossing itself and outputs it in the form of an electrical voltage signal.

Figure 4:
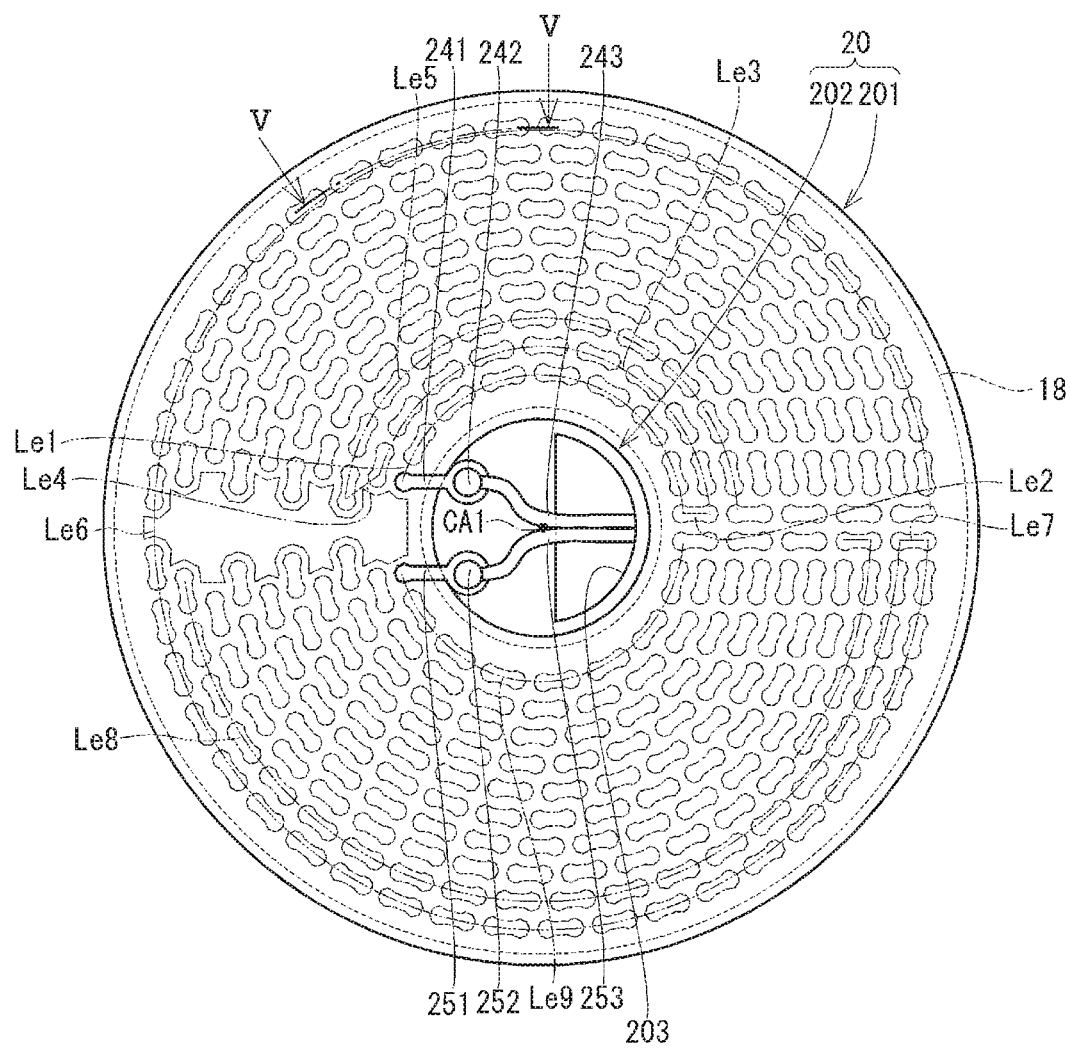
FIG. 4 is a schematic view which illustrates a heat flux sensor installed in the failure diagnostic apparatus shown in FIGS. 1 and 2.

The structure of the heat flux sensor 20 will be described with reference to FIGS. 4 and 5. The heat flux sensor 20 includes the sensing device 201 and the terminal unit 202. The heat flux sensor 30 has the same structure as that of the heat flux sensor 20, and explanation thereof in detail will be omitted here.

The heat flux sensor 20, as used in this disclosure, may be implemented by one of various types of heat flux sensor known in the art or on the market. The sensing device 201 of the heat flux sensor 20 in this embodiment is, as can be seen in FIG. 4, arranged in an annular shape. The sensing device 201, as illustrated in FIG. 5, includes the insulating substrate 21, the back-side protective member 22, the front-side protective member 23, the first layer-to-layer connecting members 24, and the second layer-to-layer connecting members 25. FIG. 5 enlarges the scale of the parts upward, i.e., from the back-side protective member 22 to the front-side protective member 23 for the ease of visibility of the structure of the sensing device 201.

The insulating substrate 21 is made of thermoplastic resin film. The insulating substrate 21 has a plurality of via holes 211 passing through a thickness thereof. The via holes 211 have the first layer-to-layer connecting members 24 or the second layer-to-layer connecting members 25 disposed therein. Specifically, ones of the via holes 211 (which will also be referred to below as first via holes) have the first layer-to-layer connecting members 24 mounted therein. Ones of the via holes 211 (which will also be referred to below as second via holes) located adjacent the first via holes 211 have the second layer-to-layer connecting members 25 mounted therein. In other words, the insulating substrate 21 has the first layer-to-layer connecting members 24 and the second layer-to-layer connecting members 25 which are arranged alternately.

The back-side protective member 22 is made of thermoplastic resin film and has the same size as that of the insulating substrate 21. The back-side protective member 22 is arranged on the back surface 212 of the insulating substrate 21. The back-side protective member 22 has the surface 221 which faces the insulating substrate 21 and on which a plurality of back-side patterns made of copper foil are formed. The back-side patterns (i.e., a conductive pattern) 214 electrically connect between the first layer-to-layer connecting members 24 and the second layer-to-layer connecting members 25.

The front-side protective member 23 is made of thermoplastic resin film and has the same size as that of the insulating substrate 21. The front-side protective member 23 is arranged on the surface 213 of the insulating substrate 21. The front-side protective member 23 has the surface 231 which faces the insulating substrate 21 and on which a plurality of front-side patterns (i.e., conductive patterns) 215 made of copper foil are formed. The front-side patterns 215 electrically connect between the first layer-to-layer connecting members 24 and the second layer-to-layer connecting members 25.

The first layer-to-layer connecting members 24 are made from a metallic material which is different in type from the metallic material from which the second layer-to-layer connecting members 25 are made in order to exhibit the Seebeck effect. For example, the first layer-to-layer connecting members 24 are each made of metallic alloy formed by solid-state sintering P-type Bi—Sb—Te alloy powder so as to maintain the original crystal structures of the metallic atoms. The second layer-to-layer connecting members 25 are each made of metallic alloy formed by solid-state sintering N-type Bi—Te alloy powder so as to keep crystal structures of the metallic atoms as they are originally. The first layer-to-layer connecting members 24 and the second layer-to-layer connecting members 25 are alternately connected in series with each other by the back-side patterns 214 and the front-side patterns 215.

In the sensing device 201, each of the back-side patterns 214, each of the first layer-to-layer connecting members 24, each of the front-side patterns 215, and each of the second layer-to-layer connecting members 25 are electrically connected in this order, that is, an order from the back-side pattern 214, to the first layer-to-layer connecting member 24, to the front-side pattern 215, and then to the second layer-to-layer connecting member 25. In the following discussion, a conductive line made up of a plurality of discrete conductors: the back-side patterns 214, the first layer-to-layer connecting members 24, the front-side patterns 215, and the second layer-to-layer connecting members 25 will be referred to as a sensing conductive line of the sensing device 201. The elastic member 18 is, as can be seen in FIG. 4, arranged adjacent an end of the sensing conductive line which is close to the cover plate 17.

The sensing conductive line of the heat flux sensor 20, as clearly illustrated in FIG. 4, includes a plurality of arc-shaped groups of conductors and conductors (which will also be referred to below as connecting conductors) which are arranged linearly in the radial direction of the heat flux sensor 20 and each of which connects every adjacent two of the arc-shaped groups of conductors. Each of the conductors illustrated in the arc-shaped group in FIG. 4 represents either of the back-side pattern 214 or the front-side pattern 215 depending upon a transverse section of the heat flux sensor 20. Note that FIG. 5 is a sectional view taken in a thickness-wise direction of the heat flux sensor 20 along the line V-V in FIG. 4. Specifically, in FIG. 4 which is a top plan of the heat flux sensor 20 illustrated in FIG. 5 when viewed from the cover plate 17, a radially innermost one of the arc-shaped groups of the conductors, as indicated by a two-dot chain line Le1 and referred to below as an innermost sensing conductive line or a first sensing conductive line, is electrically connected to an adjacent one of the arc-shaped groups of the conductors, as indicated by a two-dot chain line Le3 and referred to below as a second sensing conductive line, using the conductor indicated by a two-dot chain line Le2. The second sensing conductive line Le3 is electrically connected to an adjacent one of the arc-shaped groups of the conductors, as indicated by a two-dot chain line Le5 and referred to below as a third sensing conductive line, using the conductor (not shown in FIG. 4), as indicated by a two-dot chain line Le4 and diametrically opposed to the conductor Le2 across the center axis CA1 of the heat flux sensor 20.

An upper half of the sensing conductive line which is formed by turning the arc-shaped groups of the conductors to the left and right sides, as viewed in FIG. 4, in the above away is electrically connected to an outermost one of the groups of the conductors, as indicated by a two-dot chain line Le6 and referred to below as an outermost sensing conductive line. The outermost sensing conductive line Le6 extends almost completely along an outer circumference of the heat flux sensor 20. The outermost sensing conductive line Le6 extends counterclockwise from the upper side to the lower side in FIG. 4.

The outermost sensing conductive line Le6 is electrically connected to a radially inwardly adjacent one of the arc-shaped groups of the conductors, as indicated by a two-dot chain line Le8, using the conductor, as indicted by a two-dot chain line Le7. Subsequently, the arc-shaped groups of the conductors are turned a plurality of times in the same way as that in which the upper half of the sensing conductive line to make a lower half of the sensing conductive line, as viewed in FIG. 4. The lower half of the sensing conductive line is finally electrically connected to an innermost one of the arc-shaped groups of the conductors, as indicated by a two-dot chain line Le9 which is separate from the innermost sensing conductive line Le1.

The terminal unit 202 is disposed in the center of the heat flux sensor 20. The terminal unit 202 is equipped with the connecting terminals 241 and 251, the connecting bumps 242 and 252, and the output lines 243 and 253.

The connecting terminals 241 and 251 are located near an outer circumference of the terminal unit 202. The connecting terminal 241 is electrically connected to the innermost sensing conductive line Le1 of the sensing conductive line which is located closest to the connecting terminal 241. The connecting terminal 251 is electrically connected to the innermost sensing conductive line Le9 of the sensing conductive line which is located closest to the connecting terminal 251.

The connecting bumps 242 and 252 are disposed on the connecting terminals 241 and 251, respectively. The connecting bump 242 connects between the connecting terminal 241 and the output line 243. The connecting bump 252 connects between the connecting terminal 251 and the output line 253.

The output lines 243 and 253 extend outwardly in the radial direction of the heat flux sensor 20. The output lines 243 and 253 are electrically connected to the connecting bumps 242 and 252. The output lines 243 and 253 pass through the semi-circular opening 203 of the terminal unit 202. Specifically, the output lines 243 and 253 extend from the surface of the heat flux sensor 20 facing the elastic member 18 outside the heat flux sensor 20.

Figure 5:
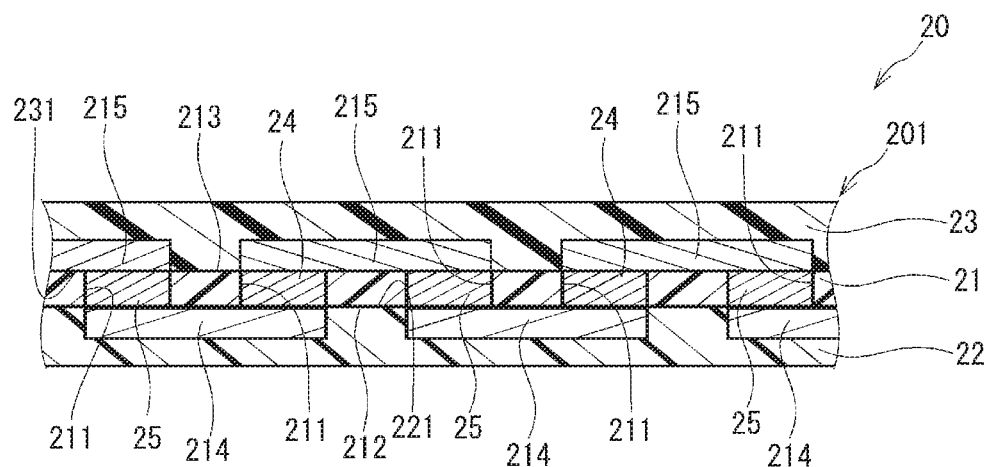
FIG. 5 is a sectional view taken along the line V-V in FIG. 4.

The heat flux sensor 20 is responsive to a change in quantity of heat flowing in the thickness-wise direction of the heat flux sensor 20 (i.e., a direction from the back-side protective member 22 to the front-side protective member 23 in FIG. 5) to produce a change in voltage developed at the first layer-to-layer connecting members 24 and the second layer-to-layer connecting members 25 which are alternately connected in series. The heat flux sensor 20 outputs this voltage in the form of an output signal to the malfunction detector 45 through the output lines 243 and 253.

The heat flux sensor 20 and the heat flux sensor 30 have surface protective members placed in contact with each other. The heat flux sensor 20 has a negative terminal connected to a positive terminal of the heat flux sensor 30. A positive terminal of the heat flux sensor 20 and a negative terminal of the heat flux sensor 30 are connected to the malfunction detector 45. In other words, the heat flux sensor 20 and the heat flux sensor 30 are connected in series with each other.

The adjustment screw unit 40 is arranged on an opposite side of the sensor unit 15 to the anti-motor-side bearing 85. The adjustment screw unit 40 includes the adjustment screw 41, the adjustment screw holder 42, and the stopper screw 43. The adjustment screw 41 has the end surface 411 which faces the sensor unit 15 placed in direct contact with the end surface 151 of the sensor unit 15 which faces away from the anti-motor-side bearing 85. The adjustment screw holder 42 is secured to the base plate 81. The adjustment screw holder 42 has formed therein a hole through which the adjustment screw 41 extends. The adjustment screw holder 42 has an inner wall which defines the hole and has a thread ridge engaging a thread groove in the adjustment screw 41. The adjustment screw 41 is movable along the center axis A83 of the ball screw 83 close or away from the adjustment screw holder 42 to place the end surface 411 at a desired position relative to the adjustment screw holder 42. The stopper screw 43 holds the adjustment screw 41 at the desired position relative to the adjustment screw holder 42.

The malfunction detector 45 is implemented by a known microcomputer equipped with a CPU, a ROM, and a RAM.

The malfunction detector 45 is electrically connected to the sensing conductive line through the cable 46. The malfunction detector 45 analyzes an output from the heat flux sensors 20 and 30 to calculate the quantity of heat flux passing through the heat flux sensors 20 and 30.

The operation of the failure diagnostic apparatus 1 will be described below with reference to FIG. 6 which demonstrate changes in output from the heat flux sensors 20 and 30 of the failure diagnostic apparatus 1 with time.

When the cover plate 17 is moved by movement of the bearing stopper 10 of the failure diagnostic apparatus 1, it will cause the elastic members 18 and 19 to expand or contract. The expansion or contraction of the elastic members 18 and 19 causes the elastic members 18 and 19 to produce or absorb heat. This creates a heat flux in the elastic members 18 and 19. The heat flux sensors 20 and 30 then output voltage, as developed in the first layer-to-layer connecting members 24 and the second layer-to-layer connecting members 25 as a function of the heat flux, to the malfunction detector 45. The malfunction detector 45 then calculates the quantity of heat flux passing through the heat flux sensors 20 and 30 as a function of the output from the heat flux sensors 20 and 30 and also calculates a change in deformation or location of the anti-motor-side bearing 85 as a function of the determined quantity.

Figure 6:
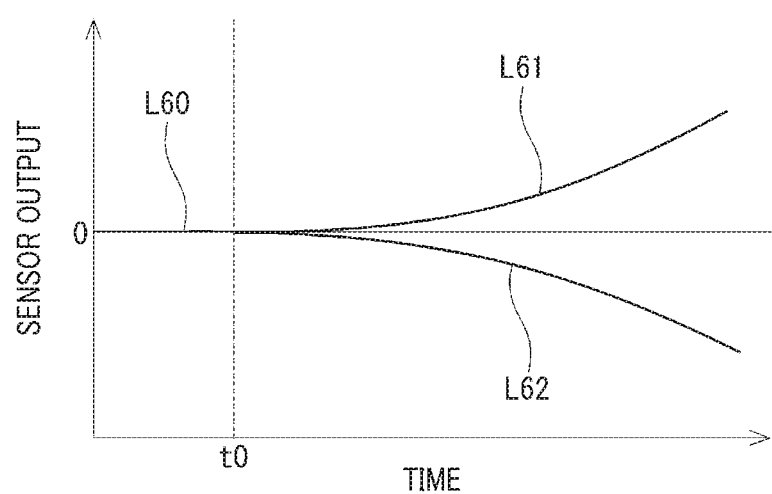
FIG. 6 is a graph which demonstrates a relation between time and sensor outputs in the failure diagnostic apparatus shown in FIGS. 1 and 2.

For instance, when the movable object 86 is accelerating in the motor direction after starting to move toward the motor 82 or when the movable object 86 is decelerating in the anti-motor direction after moving at a constant speed away from the motor 82, an output from the heat flux sensors 20 and 30 changes along a solid line indicated by L60 and L61 in FIG. 6. Specifically, after time t0 where the movable object 86 starts to accelerate or decelerate, the heat flux sensors 20 and 30 output a signal changing at a positive rate.

Alternatively, when the movable object 86 is accelerating in the anti-motor direction after starting to move away from the motor 82 or when the movable object 86 is decelerating in the motor direction after moving at a constant speed toward the motor 82, an output from the heat flux sensors 20 and 30 changes along a solid line indicated by L60 and L62 in FIG. 6. Specifically, after time t0 where the movable object 86 starts to accelerate or decelerate, the heat flux sensors 20 and 30 output a signal changing at a negative rate.

A relationship between voltage developed at the heat flux sensor 20 and that developed at the heat flux sensor 30 will be discussed below. When a heat flux flows from right to left in FIG. 3, the heat flux sensor 20 outputs a positive voltage signal which changes at a positive rate. Alternatively, when a heat flux flows from left to right in FIG. 3, the heat flux sensor 30 outputs a negative voltage signal which changes at a negative rate.

For example, when force, as indicated by an arrow F31 in FIG. 3, is exerted on the sensor unit 15 to move the cover plate 17 from right to left in FIG. 3, the elastic member 18 is compressed, so that it produces heat. The heat then flows through the heat flux sensor 20 toward the heat flux sensor 30, so that the heat flux sensor 20 outputs a positive voltage. The elastic member 19 is, like the elastic member 18, compressed, so that it produces heat. The heat then flows through the heat flux sensor 30 toward the heat flux sensor 20, so that the heat flux sensor 30 outputs a positive voltage. Since the heat flux sensor 20 and the heat flux sensor 30 are connected in series with each other, the sum of the positive voltages developed by the heat flux sensors 20 and 30 is inputted to the malfunction detector 45.

When the force F31 is released from the cover plate 17, it will cause the elastic member 18 to be restored, so that it absorbs heat. This results in a flow of heat flux from the heat flux sensor 30 to the elastic member 18, so that the heat flux sensor 20 produces a negative voltage. The elastic member 19 is, like the elastic member 18, restored so that it absorbs heat, thereby resulting in a flow of heat flux from the heat flux sensor 20 to the elastic member 19. The heat flux sensor 30 then outputs a negative voltage. Since the heat flux sensor 20 and the heat flux sensor 30 are connected in series with each other, the sum of the negative voltages developed by the heat flux sensors 20 and 30 is inputted to the malfunction detector 45.

For example, a heat flux is created by external thermal energy, such as heat generated by mechanical friction on the ball screw 83, which is not caused by expansion or contraction of the elastic members 18 and 19. Such a heat flux flows from, for example, the elastic member 18 to the elastic member 19 in FIG. 3, so that the heat flux sensor 20 produces a positive voltage, while the heat flux sensor 30 produces a negative voltage. The heat flux sensors 20 and 30 then output to the malfunction detector 45 a voltage signal that is the positive voltage developed at the heat flux sensor 20 minus an absolute value of the negative voltage developed at the heat flux sensor 30.

Figure 7:
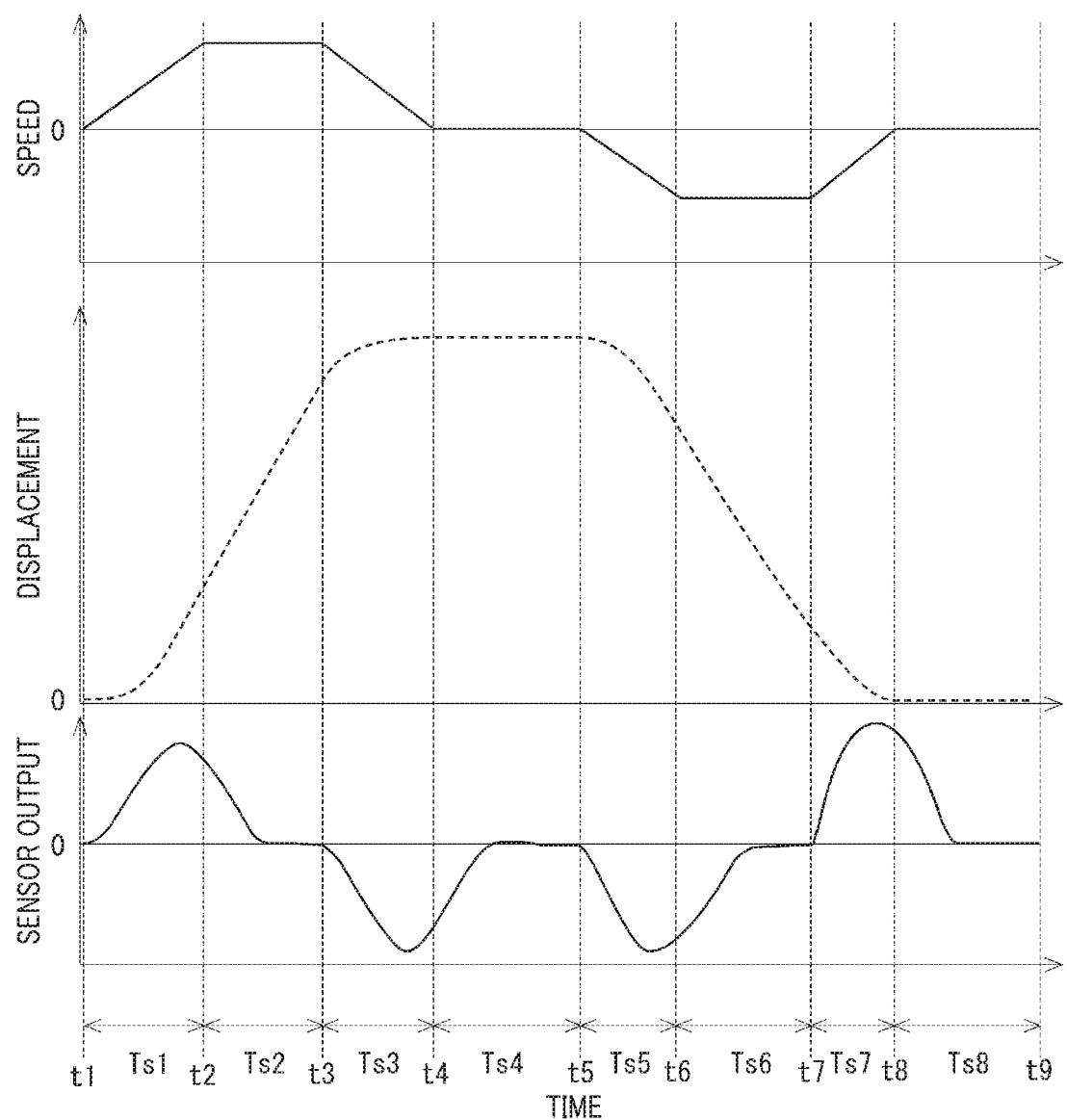
FIG. 7 is a timing chart which demonstrate a relation among speed and displacement of the movable and a sensor output in the failure diagnostic apparatus shown in FIGS. 1 and 2.

A change in output from the heat flux sensors 20 and 30 with time during use of the failure diagnostic apparatus 1 will be described with reference to FIG. 7. FIG. 7 demonstrates changes in speed and displacement of the movable object 86 and a change in output from the heat flux sensors 20 and 30 with time. In the graph of FIG. 7, the movable object 86 has a positive speed when it moves in the motor direction. When the movable object 86 is placed at a limit position which is farthest from the motor 82 within a movable range, the displacement is expressed as zero.

Before time t1, the movable object 86 is at rest. At time t1, the movable object 86 starts to move in the motor direction. The movable object 86 then accelerates in the motor direction, so that the speed of the movable object 86, as shown in FIG. 7, gradually increases. This causes the displacement of the movable object 86 to change at a positive rate with time. The heat flux sensors 20 and 30 output a signal changing at a positive gradient mainly in a period of time Ts1 between time t1 and time t2. The output from the heat flux sensors 20 and 30 starts to decrease before the speed of the movable object 86 becomes constant at time t2.

When the speed of the movable object 86 becomes constant at time t2, the displacement of the movable object 86 changes, as clearly illustrated in FIG. 7, along a straight line. This causes the output of the heat flux sensors 20 and 30 to become zero within a period of time Ts2 between time t2 and time t3. The output of the heat flux sensors 20 and 30 is kept zero until time t3.

After the movable object 86 starts to decelerate at time t3 after moving at a constant speed, the speed of the movable object 86 gradually decreases, so that the displacement of the movable object 86 changes along a line convexed upward. This causes the output of the heat flux sensors 20 and 30 to change at a negative rate almost in a period of time Ts3 between time t3 and time t4. The output of the heat flux sensors 20 and 30 starts to increase before the speed of the movable object 86 becomes zero at time t4.

After the speed of the movable object 86 become zero at time t4, the displacement of the movable object 86, as can be seen in FIG. 7, changes linearly. This causes the output of the heat flux sensors 20 and 30 to become zero in a period of time Ts4 between time t4 and time t5. The output of the heat flux sensors 20 and 30 is kept zero until time t5.

After the movable object 86 starts to move in the anti-motor direction at time t5 after being stopped, the movable object 86 accelerates in the anti-motor direction, so that the speed of the movable object 86, as illustrated in FIG. 7, gradually increases. This causes the displacement of the movable object 86 to change with time along an upward convexed curve. The output of the heat flux sensors 20 and 30 changes at a negative rate in a period of time Ts5 between time t5 and time t6. The output of the heat flux sensors 20 and 30 starts to increase before time t6 where the speed of the movable object 86 becomes constant.

After the speed of the movable object 86 becomes constant at time t6, the displacement of the movable object 86, as can be seen in FIG. 7, changes linearly. This causes the output of the heat flux sensors 20 and 30 to become zero in a period of time Ts6 between time t6 and time t7. The output of the heat flux sensors 20 and 30 is kept zero until time t7.

When the movable object 86 has started to decelerate at time t7 after moving at a constant speed, the speed of the movable object 86, as illustrated in FIG. 7, gradually decreases. This causes the displacement of the movable object 86 to change along a line convexed downward. The output of the heat flux sensors 20 and 30 to change at a positive rate in a period of time Ts7 between time t7 and time t8. The output of the heat flux sensors 20 and 30 starts to decrease before the time t8 where the speed of the movable object 86 becomes zero.

After the speed of the movable object 86 becomes zero at time t8, the displacement of the movable object 86, as illustrated in FIG. 7, linearly changes with time. This causes the output of the heat flux sensors 20 and 30 to become zero in a period of time Ts8 between time t8 and time t9. The output of the heat flux sensors 20 and 30 is kept zero until time t9.

Figure 8:
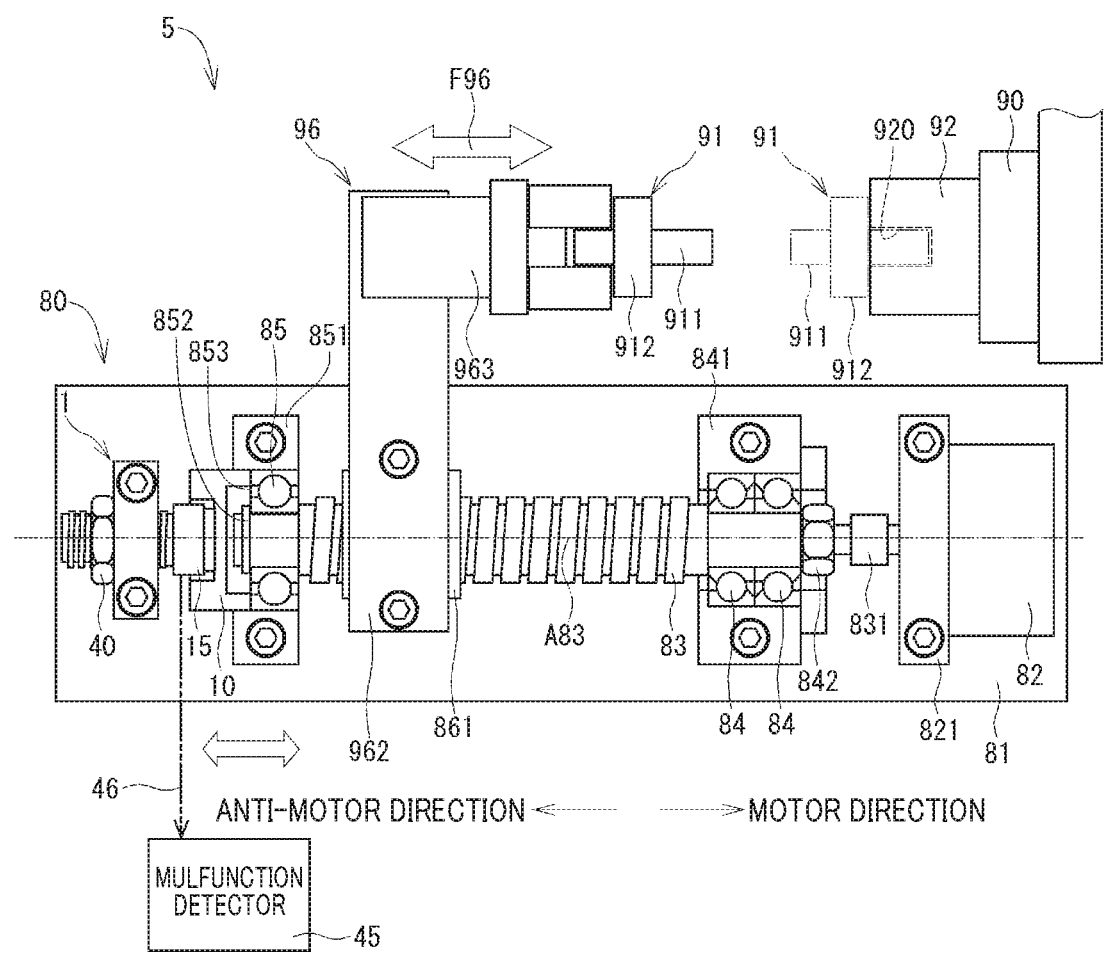
FIG. 8 is a schematic view which illustrates a press-fitting system equipped with a ball screw conveyer according to the first embodiment.

A change in sensor output from the failure diagnostic apparatus 1 during operation of the ball screw conveyer 80 will be described below with reference to FIGS. 8 and 9. The ball screw conveyer 80 demonstrated in FIG. 8 is equipped with the member support 96 (i.e., a conveyed object) instead of the movable object 86.

The member support 96 is arranged to be movable on the ball screw 83 along the center axis A83 of the ball screw 83 in a movable range between the motor-side bearings 84 and the anti-motor-side bearing 85. The member support 96 includes the ball nut 861 through which the ball screw 83 passes, the arm 962, and the hand 963.

The arm 962 is movable together with the ball nut 861. The arm 962 extends substantially perpendicular to the center axis A83 of the ball screw 83. The hand 963 is attached to a first end of the arm 962 which is opposite a second end of the arm 962 to which the ball nut 861 is joined. The hand 963 extends from the arm 962 substantially parallel to the center axis A83 of the ball screw 83. The hand 963 has a first end and a second end opposed to the first end. The hand 963 is attached at the first end to the arm 962 and has the second end capable of gripping the press-fitting member 91. The press-fitting member 91 includes the press-fitting portion 911 which is press-fitted in the press-fitted member 92 and the stopper portion 912 which is greater in outline than the press-fitting portion 911.

The fastening device 90 working as a clamper to hold the press-fitted member 92 is arranged near the ball screw conveyer 80. The press-fitted member 92 is, as clearly illustrated in FIG. 8, retained by the fastening device 90 in alignment with the press-fitted member 92 held by the hand 963. The press-fitted member 92 has formed therein the press-fitting hole 920 into which the press-fitting member 91 is press-fitted. FIG. 8 indicates the press-fitting member 91 press-fit in the press-fitting hole 920 using a two-dot chain line.

In operation of the ball screw conveyer 80 shown in FIG. 8, when the ball screw 83 is rotated in a first direction, the member support 96 is moved in the motor direction. Alternatively, when the ball screw 83 is rotated in a second reaction opposite the first direction, the member support 96 is moved in the anti-motor direction. The press-fitting system 5 equipped with the ball screw conveyer 80 and the fastening device 90 works to use linear motion of the member support 96 along the center axis A83 of the ball screw 83 (see an arrow F96 in FIG. 8) to press-fit the press-fitting member 91 into the press-fitted member 92.

Figure 9:
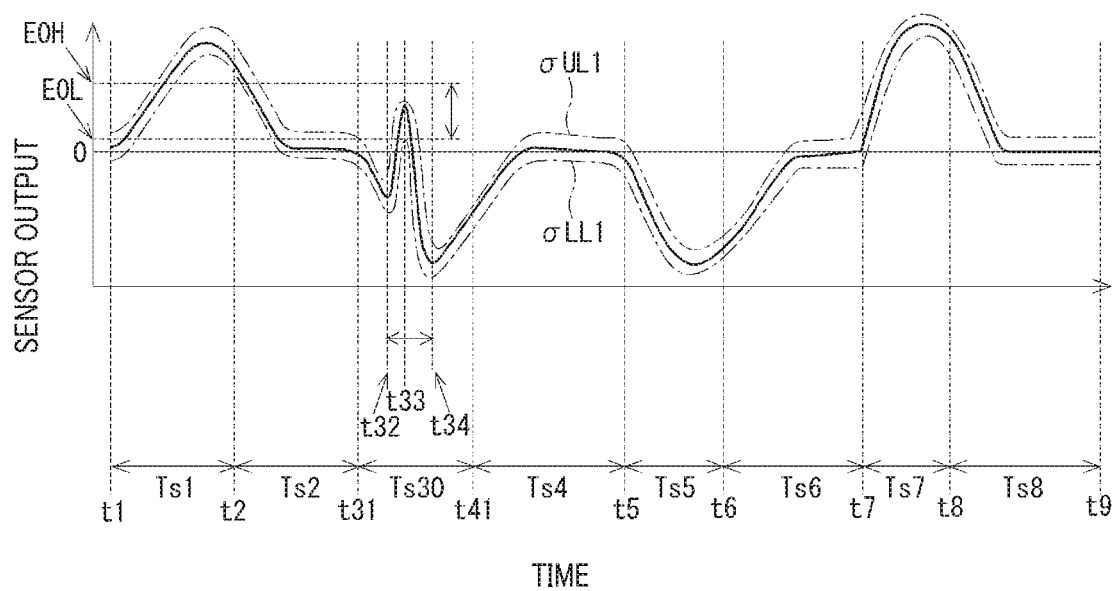
FIG. 9 is a view which represents a change in output of heat flux sensors in a press-fitting operation of the press-fitting system shown in FIG. 8.

FIG. 9 represents a change in output of the heat flux sensors 20 and 30 in a press-fitting operation of the press-fitting system 5 shown in FIG. 8 to press-fit the press-fitting member 91 into the press-fitted member 92. Specifically, the graph of FIG. 9 demonstrates a change in output of the heat flux sensors 20 and 30 when the press-fitting member 91 is press-fitted into the press-fitted member 92 in a period of time Ts30 compared with the change in sensor output during the operation of the failure diagnostic apparatus 1 shown in FIG. 7.

In operation of the press-fitting system 5, when the member support 96 is moved in the motor direction, the press-fitting member 91 is press-fitted into the press-fitting hole 920 in the press-fitted member 92 in the period of time Ts30. A change in output from the heat flux sensors 20 and 30 during the period of time Ts30 will be discussed below in detail. The press-fitting portion 911 of the press-fitting member 91 retained by the member support 96 moving at a constant speed in the motor direction contacts an inlet of the press-fitting hole 920 in the press-fitted member 92 at time t31. This causes the heat flux sensors 20 and 30 to produce an output changing at a negative rate between time t31 and time t32. Afterward, when the press-fitting portion 911 of the press-fitting member 91 starts to be inserted into the press-fitting hole 920, the pressure exerted by the press-fitted member 92 on the member support 96 will be decreased, so that the member support 96 is accelerated by the movement of the ball screw 83. This causes the output from the heat flux sensors 20 and 30 to change at a positive rate between time t32 and time t33.

When the stopper portion 912 of the press-fitting member 91, as indicated by the two-dot chain line in FIG. 8, contacts the press-fitted member 92, it will cause the member support 96 to be greatly decelerated. This causes the heat flux sensors 20 and 30 to produce an output changing at a negative rate between time t33 and time t34. Afterwards, the hand 963 releases the press-fitting member 91. The member support 96 then moves in the anti-motor direction. This causes the heat flux sensors 20 and 30 to produce an output changing at a positive rate between time t34 and time t41.

The malfunction detector 45 works to monitor the state of the ball screw conveyer 80 using the output of the heat flux sensors 20 and 30 demonstrated in FIG. 9 during the press-fitting operation in which the press-fitting member 91 is press-fitted into the press-fitted member 92.

The determination of the state of the ball screw conveyer 80 may be achieved by comparison of an output of the heat flux sensors 20 and 30 with a threshold value selected to be a maximum or a minimum value of the output of the heat flux sensors 20 and 30 within a given period of time. For instance, an allowable range of a maximum value of an output of the heat flux sensors 20 and 30 between time t32 and time t34 in FIG. 9 is defined between the sensor outputs EOH and EOL. When the press-fitting member 91 has properly finished being inserted into the press-fitted member 92, that is, the output of the heat flux sensors 20 and 30 at time t33 lies in the allowable range between the sensor outputs EOH and EOL, the malfunction detector 45 determines that the press-fitting operation has been properly completed. Alternatively, when the output of the heat flux sensors 20 and 30 at time t33 lies out of the allowable range, the malfunction detector 45 determines that the press-fitting operation has failed.

The determination of the state of the ball screw conveyer 80 may alternatively be achieved by making a σ-determination in the whole of an operating time wherein the ball screw conveyer 80 is working. Specifically, the malfunction detector 45 calculates a standard deviation of outputs of the heat flux sensors 20 and 30 sampled at multiple times of the press-fitting operation. The malfunction detector 45 defines a σ-range of an average value of the output of the heat flux sensors 20 and 30 to be between an upper limit indicated by a two-dot chain line σUL1 and a lower limit indicated by a two-dot chain line σLL1 in FIG. 9. The malfunction detector 45 determines whether the output of the heat flux sensors 20 and 30 lies out of the σ-range or not to decide whether the ball screw conveyer 80 is operating properly or not.

Figure 10:
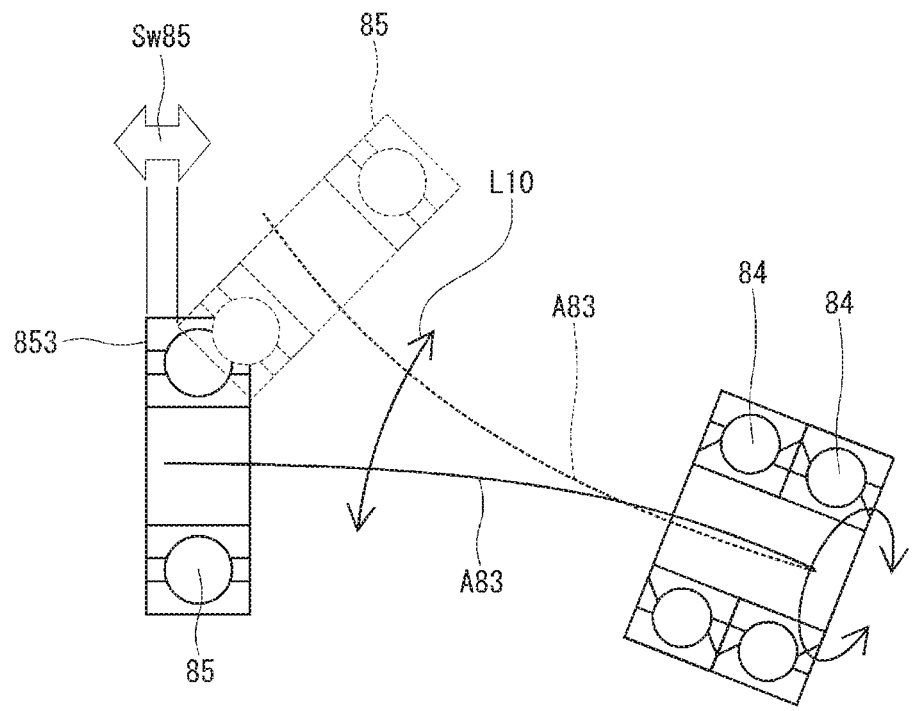
FIG. 10 is a schematic view which demonstrates an example of operation of a ball screw conveyer in the first embodiment.
Figure 11:
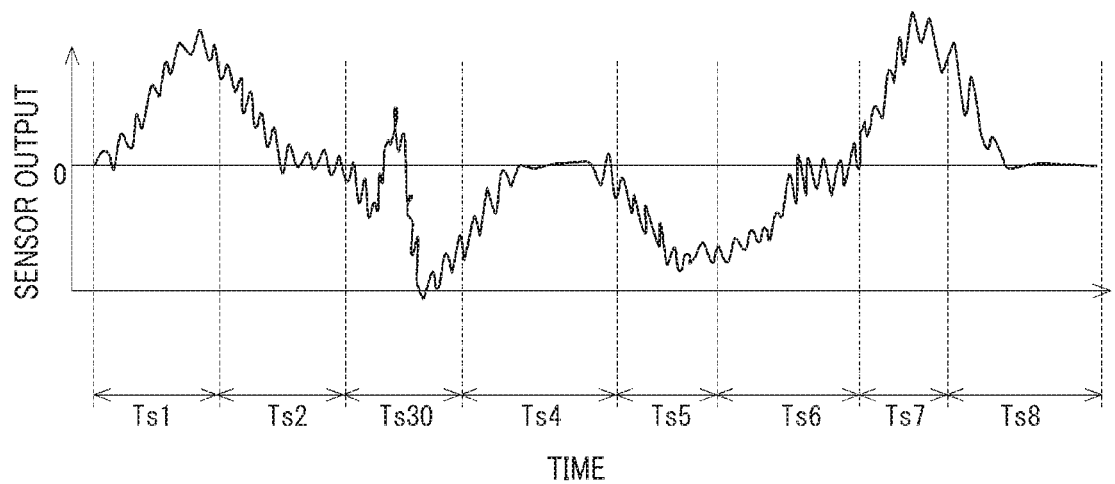
FIG. 11 is a graph which demonstrates a relation between time and sensor outputs in use of the ball screw conveyer shown in FIG. 10.

The characteristic of a change in sensor output in the failure diagnostic apparatus 1 with time during operation of the ball screw conveyer 80 shown in FIG. 8 will be described below with reference to FIGS. 10 and 11. FIG. 10 schematically demonstrates deflection of the center axis A83 of the ball screw 83 between the motor-side bearings 84 and the anti-motor-side bearing 85. The rotation of the ball screw 83 of the ball screw conveyer 80 may cause the end of the ball screw 83 (which will also be referred to as a first end) in the anti-motor-side bearing 85 to be swung, as indicated by a solid line L10 in FIG. 10, about the end of the ball screw 83 (which will also be referred to as a second end) in the motor-side bearings 84 depending upon a positional relation between the motor-side bearings 84 and the anti-motor-side bearing 85 or the configuration of the ball screw 83.

When the first end of the ball screw 83 is swung, it will cause the bearing stopper 10 placed in contact with the end surface 853 of the anti-motor-side bearing 85 to be moved, as indicated by an arrow Sw85 in FIG. 10. This causes the heat flux sensors 20 and 30 to produce an output demonstrated in FIG. 11 whose waveform is given by addition of a wave cyclically changing upon rotation of the ball screw 83 to the wave shown in FIG. 7.

The failure diagnostic apparatus 1 in the first embodiment offers the following beneficial advantages.

a-1) The failure diagnostic apparatus 1 is, as described above, equipped with the heat flux sensors 20 and 30 which measure the quantity of heat flux in the elastic members 18 and 19 which depends upon the degree of displacement of the anti-motor-side bearing 85. The failure diagnostic apparatus 1 works to detect the failure in operation of the ball screw conveyer 80 using an output from the heat flux sensors 20 and 30 which is a function of the quantity of heat flux.

a-2) The failure diagnostic apparatus 1 is equipped with the elastic members 18 and 19 which absorb or produce heat even when the anti-motor-side bearing 85 is moved slightly. The heat flux sensors 20 and 30 are capable of producing an output in response to such a slight movement of the anti-motor-side bearing 85, thereby ensuring the stability in operation of the failure diagnostic apparatus 1 to detect the displacement or movement of the anti-motor-side bearing 85 with a high degree of accuracy.

As apparent from the above discussion, the failure diagnostic apparatus 1 in the first embodiment is capable of detecting undesirable movement of the anti-motor-side bearing 85 using the quantity of heat flux arising from the failure in operation of the ball screw conveyer 80, thereby detecting the malfunction of the ball screw conveyer 80 quickly and accurately.

b) The failure diagnostic apparatus 1 has the bearing stopper 10 placed in direct contact with the anti-motor-side bearing 85, thereby stopping the bearing contact member 10 from being rotated by rotation of the ball screw 83. This minimizes addition of noise to the sensor output which results from the undesirable rotation of the bearing stopper 10, thereby enhancing the accuracy of the failure diagnostic apparatus 1 in detecting the failure in operation of the ball screw conveyer 80.

c) The failure diagnostic apparatus 1 has two heat flux sensors: the heat flux sensor 20 and the heat flux sensor 30 connected in series with each other. This causes the malfunction detector 45 to receive an output from the heat flux sensors 20 and 30 when the elastic members 18 and 19 produce or absorb heat created by movement or deformation of the cover plate 17 relative to the housing 16. The sensor output received by the malfunction detector 45 has a voltage level substantially twice that produced by a single heat flux sensor. When a heat flux arising from, for example, mechanical wear of the ball screw 83 unrelated to expansion or contraction of the elastic members 18 and 19 flows through the elastic members 18 and 19, it will cause outputs of the heat flux sensor 20 and the heat flux sensor 30 to be cancelled each other, so that no voltage developed by expansion or contraction of the elastic members 18 and 19 is inputted to the malfunction detector 45. The failure diagnostic apparatus 1 is, therefore, capable of producing an amplified voltage signal using a combination of two heat flux sensors: the heat flux sensors 20 and 30 upon expansion or contraction of the elastic members 18 and 19 or producing no voltage signal unrelated to expansion or contraction of the elastic members 18 and 19. This enhances the accuracy in detecting the malfunction of the ball screw conveyer 80.

d) The failure diagnostic apparatus 1 has the housing 16 made from martensitic stainless steel. Martensitic stainless steel is a magnetic material having properties which blocks an external magnetic field. This enables the failure diagnostic apparatus 1 to eliminate adverse effects of noise arising from magnetic field created by, for example, the electrical motor 82 on an output of the heat flux sensors 20 and 30, thus ensuring the accuracy in detecting the malfunction of the ball screw conveyer 80.

e) The failure diagnostic apparatus 1 is equipped with a single unit made up of the housing 16, the cover plate 17, the elastic members 18 and 19, the heat flux sensors 20 and 30. This enables a locational relation among the elastic members 18 and 19 and the heat flux sensors 20 and 30 to be kept constant within the failure diagnostic apparatus 1, thereby ensuring the stability in achieving the repeatability of movement or deformation of the cover plate 17 in detection of the malfunction of the ball screw conveyer 80.

f) The failure diagnostic apparatus 1 has the cover plate 17 and the elastic member 18 adhered to each other, the elastic member 18 and the heat flux sensor 20 adhered to each other, the heat flux sensor 20 and the heat flux sensor 30 adhered to each other, the heat flux sensor 30 and the elastic member 19 adhered to each other, and the elastic member 19 and the housing 16 adhered to each other, thereby ensuring the stability in expansion or contraction of the elastic members 18 and 19 in response to movement or deformation of the cover plate 17 and also enhancing the accuracy of the heat flux sensors 20 and 30 in detecting a change in heat flux resulting from the expansion or contraction of the elastic members 18 and 19. This enables the failure diagnostic apparatus 1 to detect a small failure in operation of the ball screw conveyer 80.

Second Embodiment

The failure diagnostic apparatus 2 for the ball screw conveyer 80 according to the second embodiment will be described below with reference to FIGS. 12 and 13.

Figure 12:
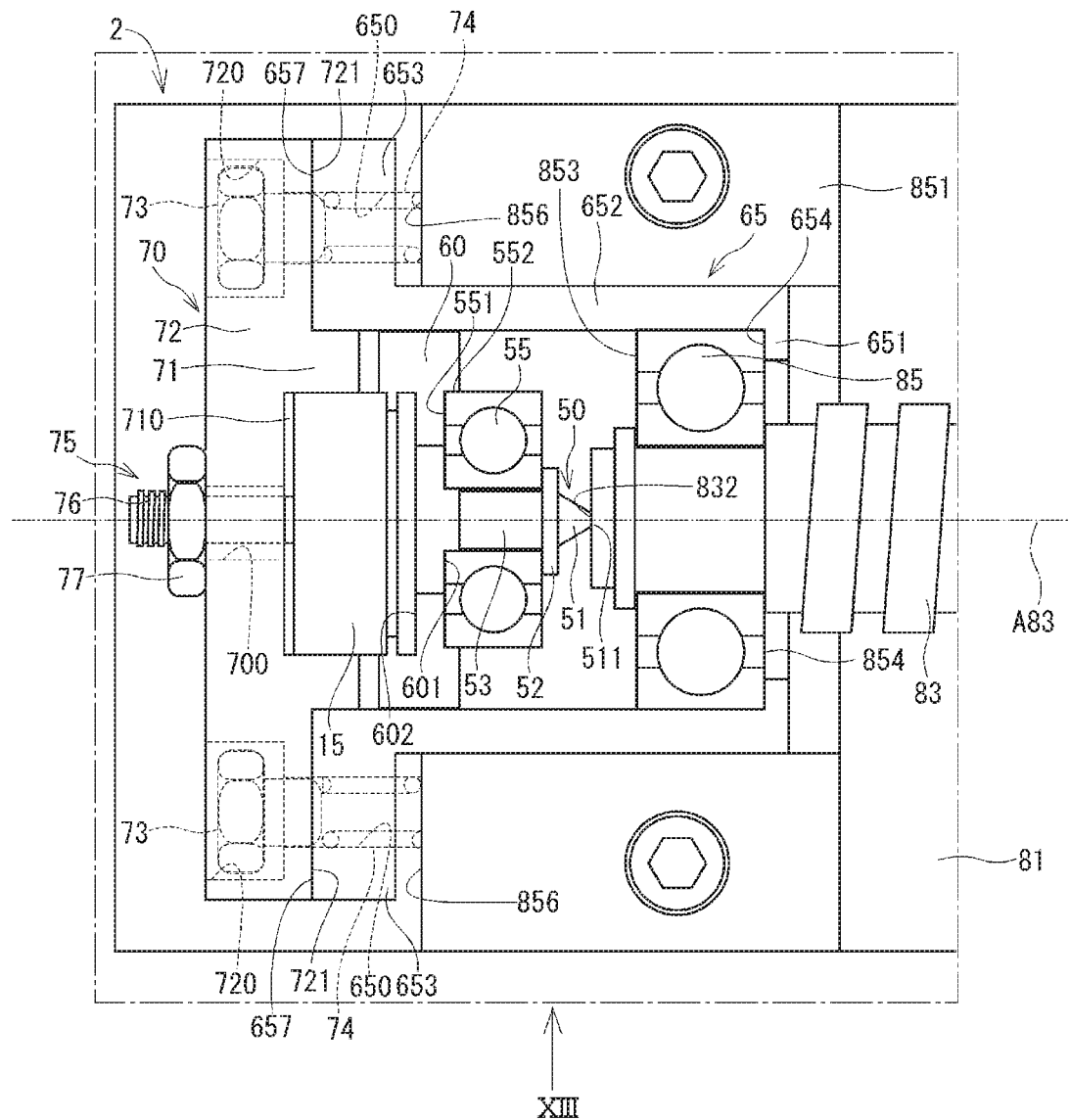
FIG. 12 is an enlarged view which illustrates a failure diagnostic apparatus according to the second embodiment.
Figure 13:
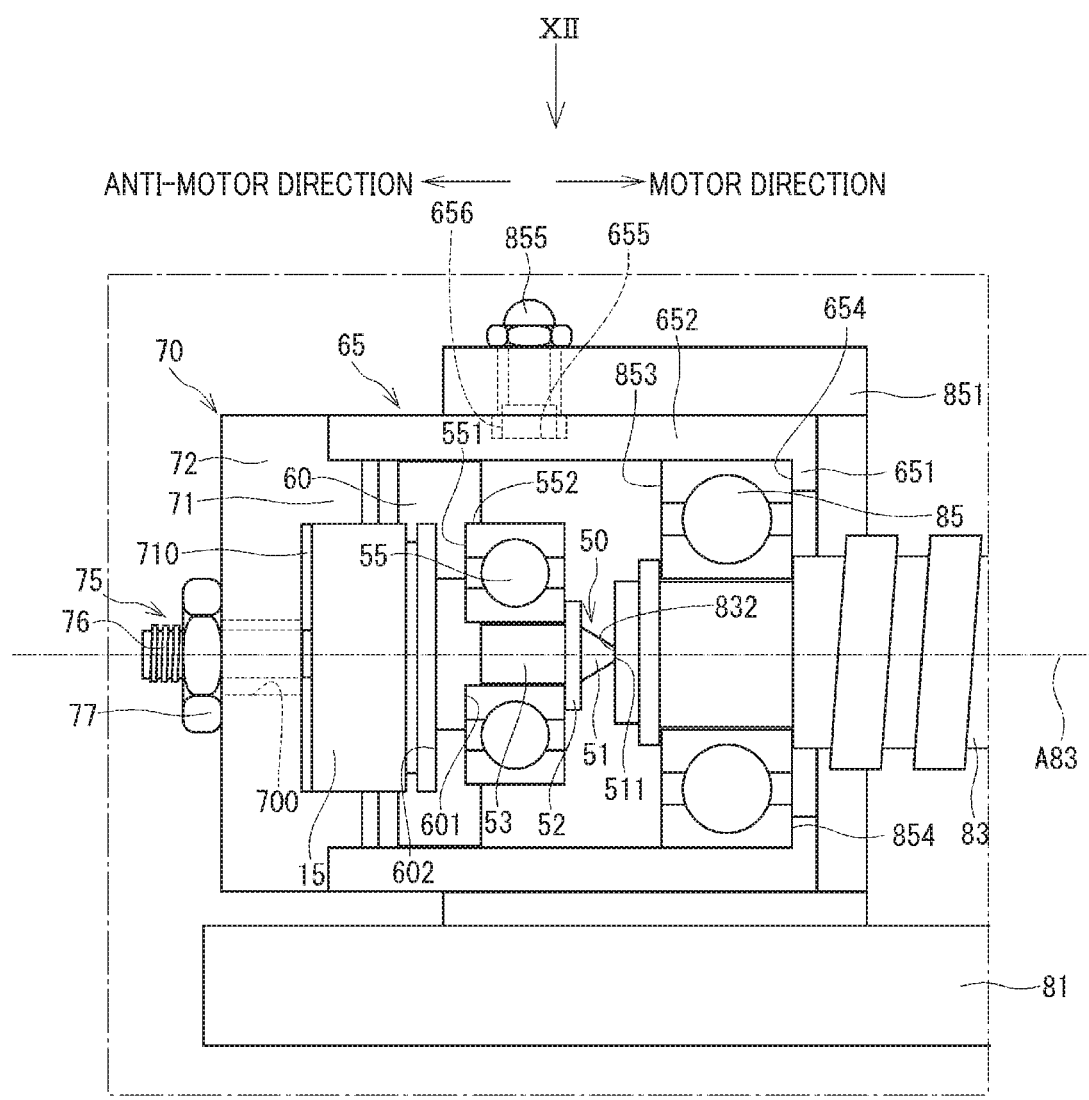
FIG. 13 is an illustration viewed from arrow XIII in FIG. 12.

FIGS. 12 and 13 are enlarged views which illustrate the failure diagnostic apparatus 2. The failure diagnostic apparatus 2 is arranged farther away from the motor 82 than the anti-motor-side bearing 85 on the ball screw conveyer 80. The failure diagnostic apparatus 2 includes the contacting member 50, the sensor-side bearing 55, the bearing stopper 60, the sensor unit 15, the first supporting member 65, the second supporting member 70, and the adjustment screw unit 75.

The contacting member 50 is arranged in contact with the end surface 832 of the ball screw 83 which faces away from the motor 82. The contacting member 50 includes the contacting portion 51, the disc 52, and the supported portion 53.

The contacting portion 51 is of a frusto-conical shape and has a smaller-diameter portion (i.e., a head) with the end surface 511 placed in direct contact with the center of the end surface 832 of the ball screw 83.

The disc 52 is attached to a larger-diameter portion of the contacting portion 51. The disc 52 has an outer diameter which is larger than an inner diameter of the sensor-side bearing 55 which will be described later in detail.

The supported portion 53 is disposed on an opposite side of the disc 52 to the contacting portion 51. The supported portion 53 is of a column or cylindrical shape and retained by the sensor-side bearing 55 to be rotatable.

The sensor-side bearing 55 is arranged radially outside the supported portion 53. The sensor-side bearing 55 retains the contacting member 50 to be rotatable.

The bearing stopper 60 is arranged in direct contact with an end surface of the sensor-side bearing 55 facing away from the anti-motor-side bearing 85. The bearing stopper 60 is of a cylindrical shape. The bearing stopper 60 has the groove 601 which is formed in a portion thereof facing the sensor-side bearing 55 and contacts the end surface 551 of the sensor-side bearing 55 facing away from the anti-motor-side bearing 85 and the radially outside wall 552 of the sensor-side bearing 55 to support the sensor-side bearing 55.

The first supporting member 65 is made of a hollow cylindrical member extending from an end of the anti-motor-side bearing 85 facing the motor 82 to outside a radially outside periphery of the sensor unit 15. The first supporting member 65 includes the inner flange 651, the hollow cylinder 652, and two outer flanges 653.

The inner flange 651 is located closer to the motor 82 than the anti-motor-side bearing 85 is. The inner flange 651 has the end surface 654 which faces away from the motor 82 and is placed in contact with the end surface 854 of the anti-motor-side bearing 85 which faces the motor 82.

The cylinder 652 is of a hollow cylindrical shape extending from the inner flange 651 in the anti-motor direction. The anti-motor-side bearing 85, the contacting member 50, the sensor-side bearing 55, the bearing stopper 60, and the sensor unit 15 are disposed inside the cylinder 652.

The cylinder 652 has the groove 655, as clearly illustrated in FIG. 13, formed in a portion of the periphery thereof which faces away from the base plate 81. The groove 655 has mounted therein the brake shoe 656 which works to stop or minimize rotation of the first supporting member 65 relative to the anti-motor-side bearing holder 851. The brake shoe 656 is pressed by the bolt 855 mounted in the anti-motor-side bearing holder 851 against the cylinder 652.

The two outer flanges 653 extend from an end of the cylinder 652 which is opposite an end thereof from which the inner flange 651 extends. The outer flanges 653 are, as can be seen in FIG. 12, oriented to extend substantially in a horizontal direction.

The second supporting member 70 is located farther away from the motor 82 than the first supporting member 65 and the sensor unit 15 are. The second supporting member 70 includes the sensor unit support 71 and the base 72.

The sensor unit support 71 is located farther away from the motor 82 than the sensor unit 15 is. The sensor unit support 71 has formed therein the chamber 710 in which the sensor unit 15 is disposed.

The base 72 is located farther away from the motor 82 than the sensor unit support 71 is. The base 72 is formed integrally with the sensor unit support 71. The base 72 has an outer diameter larger than that of the sensor unit support 71 and also has the end surface 721 placed in contact with the end surfaces 657 of the outer flanges 653 of the first supporting member 65 which face away from the motor 82.

The base 72 has a plurality of through-holes 720 which open at the end surface 721 and extend through a thickness of the base 72 in an axial direction of the ball screw 83. The through-holes 720 communicate with the through-holes 650 in the outer flange 653. The through-holes 720 and 650 have mounted therein the bolts 73 which connect the first supporting member 65 and the second supporting member 70 together.

The spring 74 is disposed in each of the through-holes 650. The spring 74 has a length with a first end and a second end. The spring 74 has the first end placed in contact with the end surface 856 of the anti-motor-side bearing holder 851 which faces away from the motor 82 and also has the second end placed in contact with an end of the bolt 73 which faces the motor 82. The springs 74 press the first supporting member 65 and the second supporting member 70 so as to urge the first supporting member 65 and the second supporting member 70 away from the anti-motor-side bearing holder 851.

The adjustment screw unit 75 is arranged on an opposite side of the second supporting member 70 to the sensor unit 15. The adjustment screw unit 75 includes the adjustment screw 76 and the stopper screw 77. The adjustment screw 76 is inserted into the through hole 700 formed in the second supporting member 70 and placed in contact with an end surface of the sensor unit 15 which faces away from the anti-motor-side bearing 85. The adjustment screw 76 has a thread groove engaging a thread ridge formed on an inner wall of the second supporting member 70 which defines the through-hole 700, so that the adjustment screw 76 is movable relative to the second supporting member 70 in the axial direction of the ball screw 83. The stopper screw 77 serves to set the adjustment screw 76 at a selected position relative to the second supporting member 70.

Other arrangements of the failure diagnostic apparatus 2 in the second embodiment are identical with those in the first embodiment, and explanation thereof in detail will be omitted here.

The failure diagnostic apparatus 2 in the second embodiment has the contacting member 50 placed in contact with the end surface 832 of the ball screw 83 which faces away from the motor 82, thereby enabling the heat flux sensors 20 and 30 of the sensor unit 15 to produce an output indicative of the quantity of heat flux flowing in the elastic members 18 and 19 as a function of a degree of displacement of the end surface 832 of the ball screw 83. This offers the beneficial advantages discussed in the items a-1), a-2), and c) to f) in the first embodiment.

In the failure diagnostic apparatus 2 of the second embodiment, the degree of expansion or contraction of the elastic members 18 and 19 depends upon the degree of displacement of the contacting member 50 placed in contact with the end surface 832 of the ball screw 83 which faces away from the motor 82. The contacting member 50 is retained by the sensor-side bearing 55 to be rotatable, thereby causing the sensor unit 15 not to be subjected to rotation. The sensor unit 15 is, therefore, capable of directly detecting a degree of displacement of the ball screw 83 with enhanced accuracy.

Modifications

The failure diagnostic apparatus 1 or 2 is used in the ball screw conveyer 80, but may alternatively be used with another type of a ball screw actuator designed to convey an object using linear motion into which rotational motion of a ball screw is translated.

The failure diagnostic apparatus 1 or 2 is equipped with the elastic members 18 and 19 working as expandable/contractable members, but may instead include resinous, metallic, or sintered metallic members which are capable of producing heat when being contracted or absorbing heat when being expanded.

The failure diagnostic apparatus 1 or 2 is equipped with the two heat flux sensors 20 and 30 and the two elastic members 18 and 19, but may alternatively be engineered to have only one of the heat flux sensors 20 and 30 and only one of the elastic members 18 and 19.

The housing 16 of the sensor unit 15 is made from martensitic stainless steel, but may alternatively be made from another type of material, such as ferritic stainless steel or iron. The housing 16 does not necessarily need to be made from magnetic material, but may be made from austenitic stainless steel in order to increase environmental resistance thereof to corrosion.

The σ-determination has been referred to above which is achieved for the whole of an operating time of the ball screw conveyer 80 to detect the malfunction of the ball screw conveyer 80. The malfunction detector 45 may define a plurality of σ-ranges. For instance, the malfunction detector 45 may output an alert when the output of the heat flux sensors 20 and 30 lies out of a range of an average of outputs from the heat flux sensors 20 and 30±(1×σ), output a strong alert when the output of the heat flux sensors 20 and 30 lies out of a range of the average of outputs from the heat flux sensors 20 and 30±(2×σ), and bring the ball screw conveyer 80 to an emergency stop when the output of the heat flux sensors 20 and 30 lies out of a range of the average of outputs from the heat flux sensors 20 and 30±(3×σ). The determination of whether the ball screw conveyer 80 may be also achieved, as described above, using comparison of an output of the heat flux sensors 20 and 30 with a threshold value selected to be a maximum or a minimum value of the output of the heat flux sensors 20 and 30 within a given period of time, but however, may be accomplished in another way.

While the present invention has been disclosed in terms of the preferred embodiments in order to facilitate better understanding thereof, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A failure diagnostic apparatus which works to detect a failure in operation of a ball screw device in which rotational motion of a ball screw is converted to linear motion in order to convey an object, comprising:
    a contact member which is arranged in contact with a bearing which retains an end of the ball screw;
    an elastic member which expands in response to displacement of the contact member to absorb heat or contracts in response to the displacement of the contact member to produce heat;
    a heat flux sensor to which heat of the elastic member is transmitted and includes an insulating substrate, first layer-to-layer connecting members, second layer-to-layer connecting members, and conductive patterns, the insulating substrate being made of thermoplastic resin and having formed therein first via holes and second via holes which pass through a thickness of the insulating substrate and are arranged alternately, the first layer-to-layer connecting members being disposed in the first via holes, the second layer-to-layer connecting members being made from metallic material different from that of the first layer-to-layer connecting members and disposed in the second via holes, the conductive patterns alternately connecting the first layer-to-layer connecting members and the second layer-to-layer connecting members together; and
    a malfunction detector which is electrically connected to the heat flux sensor and works to detect a failure in operation of the ball screw device using an output from the heat flux sensor.

2. The failure diagnostic apparatus as set forth in claim 1, further comprising a sensor-side bearing which retains the contact member to be rotatable wherein the contact member is rotatable in contact with the ball screw.

3. The failure diagnostic apparatus as set forth in claim 1, wherein the heat flux sensor includes a first heat flux sensor and a second heat flux sensor which are provided adjacent each other as an assembly, and wherein the elastic member includes a first and a second elastic member which are disposed on opposite sides of the assembly.

4. The failure diagnostic apparatus as set forth in claim 1, further comprising a housing which is made from magnetic material and in which the heat flux sensor is disposed.

* * * * *